Patented Oct. 24, 1939

2,177,420

UNITED STATES PATENT OFFICE 2,177,420

WATER-SOLUBLE CONDENSATION PRODUCTS

Hermann Noerr and Gustav Mauthe, Leverkusen-I. G. Werk, Germany, assignors to I. G. Farbenindustrie Aktiengesellschaft, Frankfort-on-the-Main, Germany No Drawing. Application December 5, 1936, Serial No. 114,364. In Germany December 5, 1935

5 Claims. (Cl. 260—49)

This invention relates to water-soluble condensation products from phenolic substances and to a method of preparing the same.

It is known that phenol aldehyde resins may be converted into water-soluble products by sulfonation. However, in order to achieve this result it was necessary to introduce a relatively great number of sulfo groups into the molecule of the resin. The high content of sulfo groups of these products is sometimes disadvantageous, for instance, if the products are to be employed as tanning agents, since they have but a small tanning action in weakly acid or neutral media.

We have now discovered a new class of condensation products from phenolic substances and condensing agents capable of linking aromatic nuclei, which contain less than 1 sulfo group per each aromatic nucleus present therein, and nevertheless are water-soluble. Our new products may be prepared by first sulfonating a fusible resin obtainable from a phenolic substance and a condensing agent capable of linking aromatic nuclei, without rendering it water-soluble thereby, and then treating it with a further quantity of a condensing agent, until it is water-soluble.

As starting material for the process according to our invention we employ those resinous condensation products of phenolic substances which are still fusible, i. e. are not too high molecular and according to the nomenclature mostly adopted in the art belong to the group of resins commonly called "resols". These starting materials may preferably have been obtained by condensing the components in an acid medium, i. e. they may belong to the so-called "novolacs"; however, also products condensed in an alkaline medium as far as it is possible to maintain their condensation at a low degree, so that they are still fusible, may be employed for the process of the present invention. The single components used for building up the said resinous starting materials are phenolic substances, i. e. aromatic compounds containing OH-groups directly linked to an aromatic nucleus, and more especially the phenols proper, their homologues, analogues and substitution products, and, on the other hand, condensing agents capable of linking aromatic nuclei, like for instance, formaldehyde, substances yielding formaldehyde, acetaldehyde, chlor-acetone, dichlorether etc.

More particularly the process for preparing our new compounds is carried out by treating the said starting materials with less than molecular quantities of concentrated sulfuric acid or of other sulfonating agents, mixing the mass with a small quantity of water and finally further condensing it with agents capable of linking aromatic nuclei. For the latter process generally less than the molecular quantity of the condensing agent (calculated on the sulfonated condensation product) is employed, as on after-treating with an excess of the agent the products become less soluble again. Whereas the weakly sulfonated condensation products are not completely soluble in water and whereas especially on prolonged storage or on boiling their aqueous suspensions become still more insoluble, the after-treated products display a considerably improved solubility in water; their solutions, even on the addition of acids or alkalies or on boiling remain practically stable.

The products so obtainable may be employed for various purposes of industry, for instance, as dyeing agents for reserving purposes, as agents for the after-treatment of textile fibers and tissues, for example, for weighting, as thickening or binding agents, and especially as tanning agents. It has already been pointed out that especially for the last mentioned purpose it is of great importance that the products in comparison with their molecular weight or the number of aromatic nuclei contained therein contain but a small number of sulfo groups; in consequence thereof, the new water-soluble products display an excellent tanning action even in a weakly acid or neutral solution.

The following examples illustrate the invention without limiting it thereto, the parts being by weight:

Example 1

470 gs. of phenol are gradually heated to boiling with 500 gs. of water, 250 gs. of formaldehyde (techn. 30%) and 50 gs. of 10% aqueous hydrochloric acid and are kept boiling for 5 hours. The resin separating therefrom is treated with steam in order to remove the excess of phenol. The mass is then dried. 51 parts of the mass thus obtained, brittle in the cold and viscous when it is warmed, and consisting essentially of dihydroxydiphenylmethane (c. f. Beilstein, Suppl. Vol. VI, p. 488) are heated with 12.5 parts of sulfuric acid monohydrate for 1–2 hours at about 70° C. Afterwards 15 parts of water of about 40° C. are carefully added while stirring, the water being evenly taken up by the mass. Now, 7 parts of formaldehyde in 30 parts of water are gradually added and the whole is heated to 40 to 50° C. until the smell of formaldehyde has disappeared. A clear solution is obtained which on long standing does not separate. The dark color of the sulfonated products has been greatly diminished by the after-treatment. The product has an affinity for animal and plant fibers. On treating it with further quantities of formaldehyde it becomes less soluble again.

Example 2

94 parts of phenol are heated with 30 parts of monochloracetone for 5 hours to a temperature of about 100° C. 67 parts of the resin obtained are treated with 24.5 parts of sulfuric acid monohydrate for about 2 hours at a temperature of about 60° C. The sulfonation mass is diluted with 10 parts of water and after-treated with 5 parts of formaldehyde (techn. 30%) in 15 parts of water at about 50° C. until the mixture obtained displays a good solubility in water. Before cooling a further 50 parts of water are added. A syrup-like solution is obtained which may be diluted with water in any proportion without any precipitation taking place.

Example 3

108 parts of crude cresol (DAB VI) are gradually heated with 50 parts of formaldehyde (techn. 30%), with 200 parts of water and 10 parts of a 10% hydrochloric acid to about 90° C., this temperature being maintained for about 5 hours. The resin separating therefrom is carefully dried in vacuo. 100 parts of the mass thus obtained are treated with 45 parts of sulfuric acid monohydrate for 1–2 hours at a temperature of about 60° C. 25 parts of water are slowly added to the viscous mass, while stirring. Finally the mass is after-treated with 7.5 parts of acetaldehyde in 35 parts of water at a temperature of about 60° C. until the smell of acetaldehyde has nearly disappeared. After further diluting, the mixture is neutralized with ammonia and by adding formic acid a pH-valve of about 3.5 is established.

The solution is capable of tanning animal hides to yield light and soft leathers displaying a relatively good fastness to light.

Example 4

188 parts of phenol are caused to react with 100 parts of formaldehyde (30%) and 60 gs. of caustic soda of 35° Bé. The mixture is gradually heated to 100° C. the temperature being maintained for 4 hours. The mass is then precipitated with 75 parts of a 24% hydrochloric acid, washed and well dried. 100 parts of the resin thus obtained are treated at about 70° C. with 40 parts of a 100% sulfuric acid in the course of half an hour, the temperature being maintained for about 1 hour. Then the mass is diluted with 50 parts of water and finally after-treated with 15 parts of techn. formaldehyde in 65 parts of water at a temperature of about 50° C. A viscous solution is obtained which may be diluted with water in any proportion.

We claim:

1. A process for preparing water-soluble condensation products which comprises sulfonating a fusible condensation product derived from a phenol and an agent capable of linking aromatic nuclei selected from the class consisting of acetaldehyde, chloracetone, dichlorether, formaldehyde and subsances yielding formaldehyde, while introducing at the most one sulfonic acid group into the condensation product calculated per every two aromatic nuclei contained therein, and without rendering the condensation product completely water-soluble thereby, and then treating the sulfonated product with a further quantity of said agent until it is completely water-soluble.

2. A process for preparing water-soluble condensation products which comprises sulfonating a fusible condensation product derived from phenol and formaldehyde while introducing at the most one sulfonic acid group into the condensation product calculated per every two benzene nuclei contained therein, and without rendering the condensation product completely water-soluble thereby, and then treating the sulfonated product with a further quantity of formaldehyde until it is completely water-soluble.

3. A process for preparing water-soluble condensation products which comprises sulfonating a fusible condensation product derived from a cresol and formaldehyde while introducing at the most one sulfonic acid group into the condensation product calculated per every two benzene nuclei contained therein, and without rendering the condensation product completely water-insoluble thereby, and then treating the sulfonated product with a further quantity of formaldehyde until it is completely water-soluble.

4. A process for preparing water-soluble condensation products which comprises heating about 51 parts of a condensation product essentially comprising dihydroxydiphenylmethane with about 12.5 parts of sulfuric acid monohydrate for about 1 to 2 hours to about 70° C., diluting the resulting mixture with water and heating the product thus obtained with formaldehyde until it is completely soluble in water.

5. A process for preparing water-soluble condensation products which comprises heating about 100 parts of a fusible condensation product prepared from about 1 molecular quantity of technical cresol and about ½ molecular quantity of formaldehyde, with about 45 parts of sulfuric acid monohydrate for 1 to 2 hours to about 60° C., diluting the resulting mixture with water and heating the product thus obtained with acetaldehyde until it is completely soluble in water.

HERMANN NOERR.
GUSTAV MAUTHE.

CERTIFICATE OF CORRECTION.

Patent No. 2,177,420. October 24, 1939.

HERMANN NOERR, ET AL.

It is hereby certified that error appears in the printed specification of the above numbered patent requiring correction as follows: Page 2, second column, line 35-36, claim 3, for the word "water-insoluble" read water-soluble; and that the said Letters Patent should be read with this correction therein that the same may conform to the record of the case in the Patent Office.

Signed and sealed this 12th day of March, A. D. 1940.

(Seal)

Henry Van Arsdale,
Acting Commissioner of Patents.